United States Patent [19]

Kane et al.

[11] Patent Number: 4,867,015
[45] Date of Patent: Sep. 19, 1989

[54] ROCK DRILLING BIT AND A METHOD OF PRODUCING THE SAME

[75] Inventors: Robert F. Kane, Houston; Joseph J. Portugal; Pual S. Kuzniar, both of Spring, all of Tex.

[73] Assignee: Sandvik Rock Tools, Inc., Bristol, Va.

[21] Appl. No.: 197,507

[22] Filed: Apr. 25, 1988

Related U.S. Application Data

[62] Division of Ser. No. 946,442, Dec. 23, 1986, Pat. No. 4,756,373.

[51] Int. Cl.$^4$ .......................... B21K 5/02; F21B 10/46
[52] U.S. Cl. ............................... 76/108 A; 76/DIG. 2
[58] Field of Search ............ 76/101 R, 101 E, 108 R, 76/108 A, DIG. 11, DIG. 12, DIG. 2

[56] References Cited

U.S. PATENT DOCUMENTS 4,679,640 7/1987 Crawford .......................... 76/108 A Primary Examiner—Roscoe V. Parker
Attorney, Agent, or Firm—Burns, Doane, Swecker & Mathis

[57] ABSTRACT

A rock drilling bit comprises a steel body defining a cutting face with hard material inserts press-fitted into preformed openings in the cutting face. The inserts have ends extending outwardly of the cutting face which perform the actual drilling or cutting operation. The face surface of the body is case hardened except for narrow continuous bands about each insert opening. A method particularly suited for forming the case hardened cutting face is also disclosed.

4 Claims, 2 Drawing Sheets

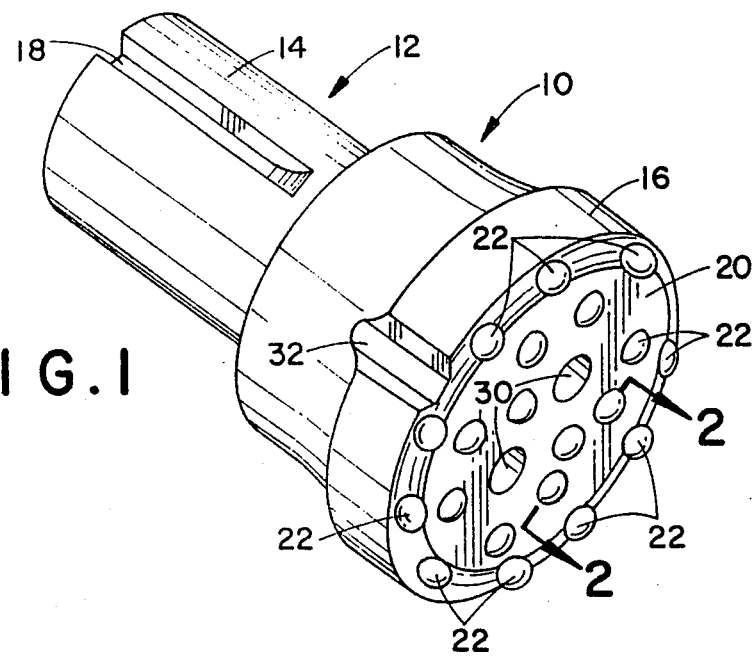
FIG. 1
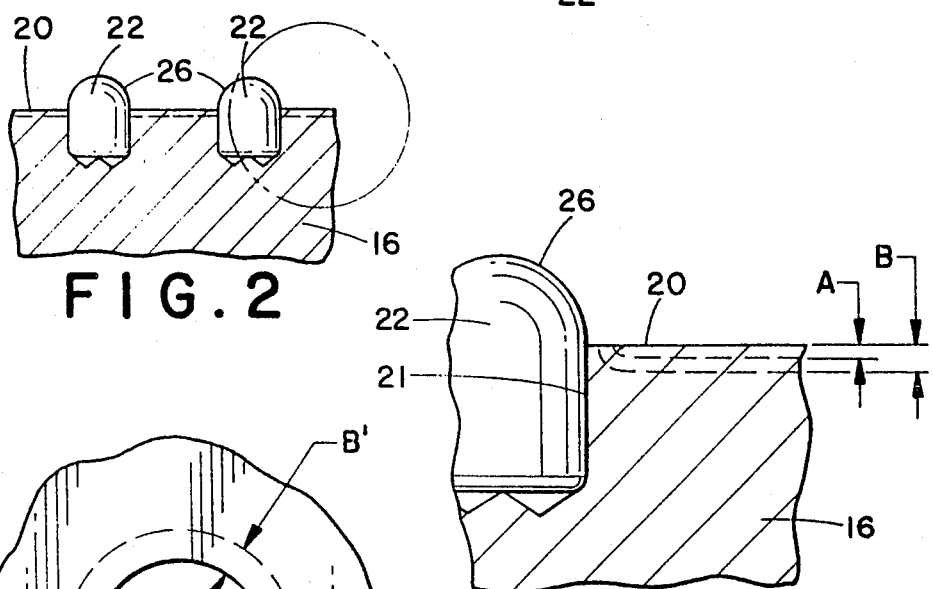
FIG. 2
FIG. 3
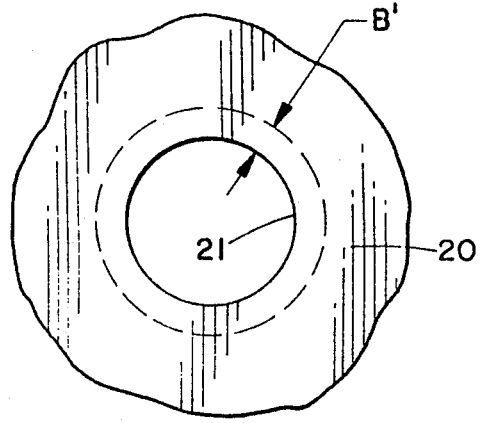
FIG. 4

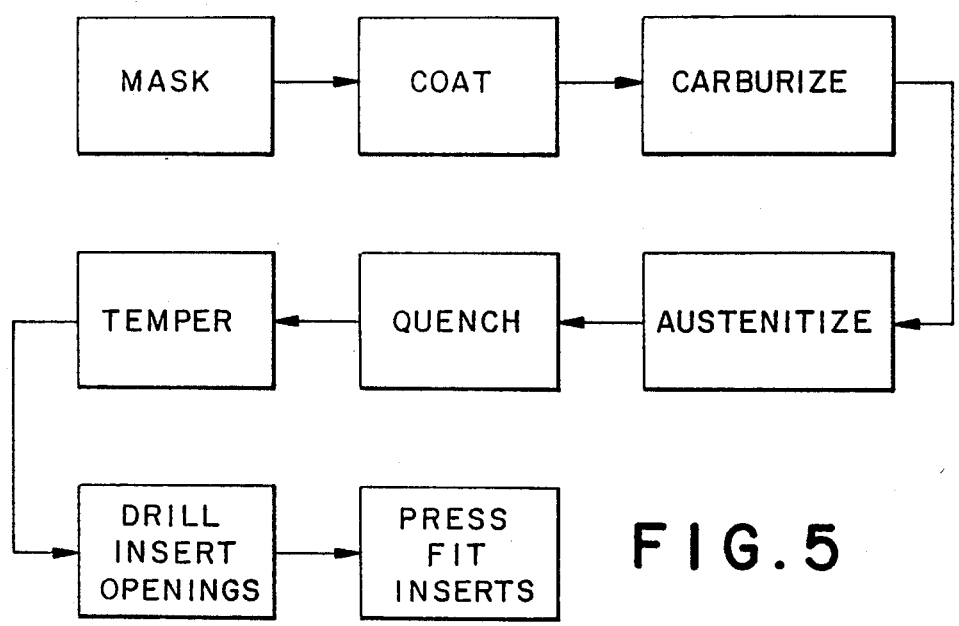
FIG. 5
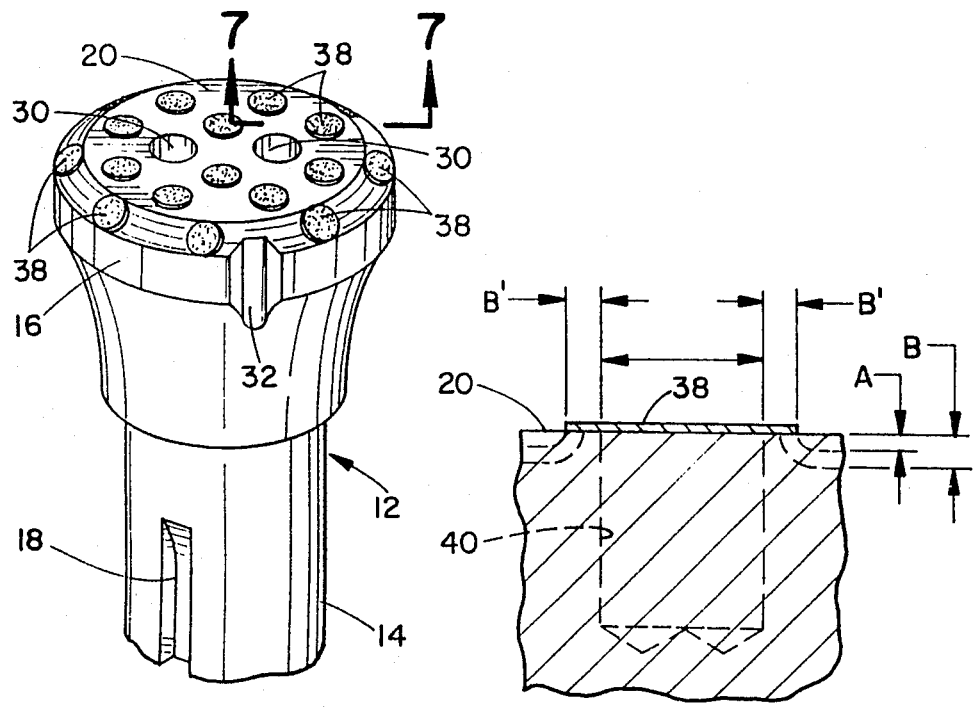
FIG. 6
FIG. 7

ROCK DRILLING BIT AND A METHOD OF PRODUCING THE SAME

This is a division, of application Ser. No. 946,442, filed Dec. 23, 1986 now U.S. Pat. No. 4,756,373.

BACKGROUND OF THE INVENTION

The subject invention is directed toward the art of rock drilling bits and, more particularly, to a bit of the type having hard material cutting inserts press-fitted into a steel body, and a method for producing such a bit.

The invention is particularly suited for use in producing rock drilling bits of the type generally referred to as percussion drilling bits and will be described with reference thereto; however, as will become apparent, the invention could equally well be used to produce roller cone bits, polycrystalline diamond compact (PCD) bits, and similar bits of the type wherein the cutting is performed by hard material inserts carried in a steel body.

The typical percussion drill bit comprises a steel bit body having a generally cylindrical mounting shank carrying an axially aligned cylindrical head defining a cutting face. A multiplicity of cylindrical, hard material cutting inserts, generally formed of sintered tungsten carbide, are press-fitted in precision drilled openings in the cutting face. The exposed ends of the cutting inserts perform the actual cutting by abrading or crushing the rock into dust and small particles. The dust and particles are flushed from the drill hole by compressed air or other pressurized fluid supplied through the drill face.

Typically, the life of such bits is dependent on the life of the hard material inserts. However, in certain rock formations, such as soft, fractured formations, the bit body itself is subjected to significant erosive wear. Under these circumstances, failure of the bit often occurs prematurely because of the wearing away of the bit body metal in the area surrounding the inserts. This results in loss of support for the inserts and loss of inserts, especially in the outer or "gage" row of inserts.

In an effort to overcome the noted problem, various attempts have been made to increase the hardness of the steel bit body by using a higher carbon content steel and heat treating for high hardness. Such attempts have typically been unsuccessful because of the difficulty of drilling the precision insert openings in a hardened steel body. Likewise drilling the openings before hardening has not been successful because the subsequent heat treating operations typically produce wide tolerance variations in the opening sizes.

Attempts have also been made to form the bit bodies from a lower carbon content steel and then carburize and case harden the body. Here again, hardening before drilling the insert openings results in significant drilling problems. Carburizing and hardening after drilling not only produces tolerance problems but, also, results in a tendency toward cracking of the hardened case when the carbide inserts are subsequently press-fitted in the openings.

SUMMARY OF THE INVENTION

The subject invention provides a rock drilling bit and method of forming the same which results in a drill body having a high hardness exterior surface and which overcomes the manufacturing and operational problems discussed above.

In accordance with one aspect of the invention, there is provided a drill bit comprising a steel body defining a cutting face with a plurality of openings formed in the cutting face and hard metal cutting inserts mounted in the openings. The inserts are mounted such that a cutting end portion extends outwardly of the cutting face. At least the cutting face of the steel body is formed to have a hardness of above 50 on the Rockwell C scale except for continuous areas closely surrounding each insert receiving opening. In the continuous areas there is a hardness gradient which decreases to a maximum hardness of no more than approximately 40 on the Rockwell C scale in the steel body immediately about the insert openings.

With the cutting face having the hardness characteristics described, the face is better able to withstand erosive wear. In addition, the circumferential areas of decreasing hardness about the insert openings facilitate insert installation and significantly reduce the possibility of producing stress fractures or cracks in the cutting face during insert installation and during subsequent usage of the bit.

According to a further aspect of the invention, the preferred method of forming the drill bit described above generally comprises providing a drill bit body having a cutting face and formed from a steel capable of being carburized. On the cutting face surface those locations are identified wherein it is necessary to form insert mounting openings. Each location so identified is covered with a material capable of preventing penetration of carbon into the body during a subsequent carburizing step. The covered area at each such location is at least slightly larger than the size of the opening to be formed at the respective location. With the coverings in place, the bit body is carburized and heat treated to case harden at least the cutting face to a hardness above 50 on the Rockwell C scale. Thereafter, the covered locations are drilled to form insert receiving openings and cutting inserts are press-fitted in the openings.

Preferably, the covered areas are larger than the openings by an amount such that the covered areas extend outwardly of each respective opening a distance at least as great as the maximum effective depth of the case hardening of the cutting face surface.

By the use of the subject method the cutting face surface can be made hard and resistant to erosion. The insert opening locations, however, retain the much lower hardness level of the parent steel body. Because the covered areas extend beyond the extent of the openings, the carbon absorption into these areas is limited such that following hardening there is a hardness gradient which decreases radially inward from the maximum present throughout the cutting face to a minimum in the steel closely surrounding each opening. As mentioned earlier, this facilitates insert installation and greatly reduces the possibility of stress fractures in the case hardened cutting face.

Accordingly, a primary object of the invention is the provision of a rock drilling bit and method of fabricating the same to achieve a high hardness cutting face but with the insert receiving openings and the area closely surrounding each opening being significantly softer.

Another object is the provision of a bit of the type described which can be manufactured using conventional metal working and heat treating equipment.

A further object is the provision of a method of forming a drill bit which is especially suited for use in soft and fractured rock formations.

BRIEF DESCRIPTION OF THE DRAWINGS

The above and other objects and advantages will become apparent from the following description when read in conjunction with the accompanying drawings wherein:

FIG. 1 is a pictorial view of a percussion type rock drilling bit formed in accordance with a preferred embodiment of the the subject invention;

FIG. 2 is a partial cross-sectional view taken on line 2—2 of FIG. 1;

FIG. 3 is an enlarged view of the circled area of FIG. 2;

FIG. 4 is an enlarged plan view of one of the insert receiving openings in the cutting face of the percussion drilling bit of FIG. 1;

FIG. 5 is a flowchart showing the sequence of steps used in the preferred method of making the percussion bit of FIG. 1;

FIG. 6 is a partial pictorial view of the head end of a percussion drilling bit of the type shown in FIG. 1 and depicting one of the manufacturing steps; and, FIG. 7 is a cross-sectional view taken on line 7—7 of FIG. 1.

DESCRIPTION OF THE PREFERRED EMBODIMENTS

Referring more particularly to the drawings wherein the showings are for the purpose of illustrating a preferred embodiment of the invention only and not for the purpose of limiting same, FIG. 1 shows a percussion drilling bit 10 which comprises a main body 12 having a generally cylindrical shank 14 and an enlarged, also generally cylindrical head portion 16. In the embodiment under consideration, the main body 12 is formed from steel. Additionally, the shank 14 and the head portion 16 are integral.

The shank 14 provides means for mounting the drill bit in an associated chuck of a conventional pneumatically operated drill motor. As shown, the shank 14 is generally cylindrical and may include one or more grooves 18 or splines to permit mounting and driving of the bit member 10.

The head portion 16 of the bit 10 is formed integrally with the shank 14. The outermost end of the head portion 16 defines a cutting face 20 which lies generally perpendicular to the axis of shank 14. Cutting face 20 is shown as generally flat with an inclined peripheral edge; however, other face configurations could be used. Carried in the cutting face 20 are a plurality of hard material cutting inserts 22. Typically, the inserts are formed from sintered tungsten carbide, although other carbides and similar hard materials can be used. The inserts 22 are press-fitted into precision drilled openings 21 formed through the cutting face 20 into the head portion 16. As best shown in FIG. 2, each of the inserts typically has a spherical outer end or head portion 26 which is located to extend outwardly of the cutting face 20. Referring again to FIG. 1 it will be noted that the insert members 22 are located at relatively regular spacings about the cutting face 20. Additionally, an outer row of the inserts 22 is positioned about the outer periphery of the head 16 as shown. This outer row of inserts is generally referred to as the gage row and normally inclined relative to the axis of the body 12. The gage row inserts control the size of the opening formed by the drill bit 10.

The inserts 22 perform the actual cutting function by a crushing and abrading of the rock encountered by the cutting face end of the bit. The rock dust and particles generated through the cutting action of the inserts 22 are ejected upwardly from the drill hole about the body of the drill bit and the associated drill motor by compressed air supplied to the cutting face through one or more axially extending openings 30 formed longitudinally through the drill body and connected with a source of compressed air (not shown). The drill bit also includes one or more flushing channels 32 which permit exit of the compressed air and the dust and particles about the bit body.

The drill bit 10 to the extent thus far described is relatively conventional. As previously discussed, problems have been encountered with significant erosion of the metal forming the cutting face 20 especially when such bits are used in certain soft and fractured rock formations. The erosion problems cause a wearing away of the cutting face particularly in the area around the gage row of inserts. This erosion and wearing away of the cutting face reduces the support for the inserts 22 and greatly shortens the life of the bits. As was previously explained, a variety of different approaches have been used in an attempt to increase the life of the bit bodies. In accordance with the subject invention, a greatly increased bit life is achieved by hardening at least the cutting face surface 20 of the bit in a particular manner. Specifically, in accordance with the subject invention, at least the outer face surface 20 is hardened to a level above 50, and preferably to 60 or more, on the Rockwell C scale. Specifically, in the subject embodiment, the steel body 12 is preferably hardened so that at least the outer surface 20 has an effective hardness of 50 or greater on the Rockwell C scale to a depth of A (See FIG. 3) which is preferably at least 0.050". As will be explained hereafter this hardness is preferably achieved by a carburizing and heat treating operation. The full depth of hardening, exaggerated for purposes of illustration, is shown as B in FIG. 3 and extends approximately 0.1" into the bit body from outer cutting face 20. At depth B, the hardness of the body has decreased to a range of approximately 40 on the Rockwell C scale.

In accordance with the subject invention the hardened nature of the cutting face 20 does not extend completely into the area closely adjacent the walls of the insert receiving openings 21. Rather, as best depicted in FIGS. 3 and 4, there is preferably a hardness gradient in the surface 20 in a circumferentially continuous band about each of the insert receiving openings 21. Preferably, the band has a width B' which is substantially equal to the depth B depicted in FIG. 3. That is, the width is substantially equal to twice the effective case hardening depth A. While the band width could be somewhat wider, it is preferably maintained as narrow as possible or else excessive erosion will be encountered in the metal surrounding the inserts due to eddy current effects. In any event, the band B' preferably is of decreasing hardness radially from the maximum hardness of the cutting surface 20 to a minimum hardness at the wall of the opening 21 such that at the wall the hardness is 40 or less on the Rockwell C scale. Preferably, the hardness at the wall of openings 21 is substantially equal to the core hardness of the body 12.

The continuous band about the openings 21 produces at least two desirable effects. First, because of the softer wall area in the openings 21, the insert openings can be drilled by conventional machining methods. Secondly, the lower hardness level material engaging the outer wall of the insert 22 and the hardness gradient in the band reduces the possibility of stress fractures being generated in the hard cutting face surface 20. However, since the great majority of the cutting face is at a significantly higher hardness level the life of the bit body is significantly extended and is not subject to the erosive wear previously encountered in bits which do not have the hardness characteristics described herein.

Many different methods could be used for producing percussion bits having the characteristics described with reference to the FIG. 1 embodiment. However, according to the subject invention the preferred method for forming such bits can best be understood by reference to FIGS. 5-7. Specifically, the process of fabricating the bits starts by providing a bit body 12 having the general configuration shown in FIG. 1 but without the insert receiving opening 21 formed or the inserts positioned therein. Preferably, the body provided is of a steel which is capable of being carburized and hardened in a manner subsequently to be described. As will be become apparent from the reading of the following description many different types of steel could be used. According to the preferred form of the invention, however, applicants use a steel known as SAE-EX 55. This steel has 25 points of carbon and, when fully hardened, a core hardness of 40 on the Rockwell C scale. As noted, other carburizing grades of steel such as A1S14320, A1S14815 or similar alloyed low carbon steels can be employed.

With the drill bit body 12 in the condition provided, the desired locations of the necessary insert mounting openings are identified on the cutting face surface 20. Each of the locations so identified is covered with a material capable of preventing penetration of carbon into the bit body in the area of each of the identified locations during the subsequent carburizing operation. Many different types of materials applied in many different ways could be used for covering each of the insert mounting opening locations. However, according to the preferred embodiment of the subject invention, a molded polyurethane mask is formed to fit over the head 16. The mask (not shown) is provided with through openings which correspond to the locations of the cutting inserts. With the mask in place, a suitable carburizing stop off paint is sprayed to coat the cutting face surface at the insert opening locations as shown in FIG. 6. Note that each of the coated areas are identified with the numeral 38. Many different types of paints or similar compounds are commercially available to prevent carbon absorption into such iron or steel bodies during carburizing operations. One such paint type material which has been used in the practice of the subject invention is sold under the tradename "NO-CARB" by Park Chemical Company of Detroit, Mich.

Preferably, and in accordance with a further aspect of the invention, the area covered by the carbon absorption preventative material is at least slightly greater than the size of the insert mounting opening which is subsequently to be formed in the cutting face 20. Specifically, and as best shown in FIG. 7, the insert mounting opening to be formed is depicted by the dashed line 40. The carbon absorption preventative 38 is applied over the area of the proposed respective drill area such that the material extends outwardly about the opening a distance substantially equal to B' as previously discussed. This distance is exaggerated for ease of illustration and discussion.

After the polyurethane mask has been removed from the head, and with the insert mounting locations covered by the material 38 as discussed above, the body 12 is carburized in a conventional gas atmosphere carburization furnace at a temperature of 1850° F. for a period of approximately 7½ hours. The particular atmosphere and/or furnace operating conditions could, of course, vary depending upon the particular results desired; however, as noted above it is desirable to raise the carbon level in at least the outer surface portion of the cutting face 20 such that it can subsequently be hardened to a level of at least 50 on the Rockwell C scale to an effective hardness depth of A as described with reference to FIG. 3.

At the completion of the carburization step the bit body is hardened in a heat treating operation which, in the subject process comprises holding the bit body at a temperature of 1550° F. for approximately 1 hour, i.e. austenitizing the bit body, followed by oil quenching. Thereafter, the bit body is tempered at a temperature of 325° F. for approximately 3 hours.

As a result of the manner in which the carbon absorption preventative material was applied to the cutting face 20, carbon is effectively prevented from entering into the area closely surrounding the location which is to be drilled for the insert receiving opening. That is, this area of the cutting face surface remains at the core hardness level of the parent material which, as noted, is approximately 40 on the Rockwell C scale. With the body 12 carburized and hardened in the manner described, the drilling of the insert openings 21 can proceed using ordinary drilling and boring equipment. Because all of the heat treating has been accomplished prior to the drilling operation it is relatively simple to maintain the required tolerances for the insert openings 21. Consequently, following drilling the inserts can be press-fitted into the opening in the usual manner.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. A method for forming a drill bit of the type used for drilling rock and including a drill bit body defining a cutting face having a plurality of hard material cutting inserts mounted in openings formed in said cutting face, said method comprising the steps of:
   (a) providing a drill bit body formed from a steel capable of being carburized, said body having a cutting face surface;
   (b) identifying on the cutting face surface those locations wherein insert mounting openings are needed;
   (c) covering each location identified in step (b) with a material capable of preventing penetration of carbon into said bit body in the area of said location during carburizing, the area covered at each such location being at least slightly greater than the size of the insert mounting opening needed;
   (d) with said insert mounting locations covered as set forth in step (c), carburizing and heat treating said bit body to case harden said cutting face to a hardness above 50 on the Rockwell C scale; and thereafter, (e) drilling an insert receiving opening at each location identified in step (b) and press-fitting hard material cutting inserts into each such opening.

2. The method as defined in claim 1 wherein the areas covered in step (c) are each greater than the size of the opening drilled at the respective area during step (e) such that said covered areas extend outwardly of their respective opening a distance at least as great as the effective depth of the case hardening of said cutting face surface.

3. The method as defined in claim 1 wherein said steel from which said bit body is formed is selected to have an interior hardness of approximately 40 on the Rockwell C scale following step (d).

4. The method as defined in claim 1 wherein said carburizing and heat treating is conducted to produce an effective depth to said case hardened cutting face surface of at least approximately 0.05 inches.

* * * * *